3,733,180
SOLID STATE COOL GAS GENERATOR
Joseph B. Heineck, Everett, and James J. Schwab, Kent,
 Wash., assignors to The Boeing Company, Seattle,
 Wash.
Filed Jan. 8, 1971, Ser. No. 104,889
Int. Cl. B01j 7/00; B05b 1/00; B60r 21/00
U.S. Cl. 23—281    1 Claim

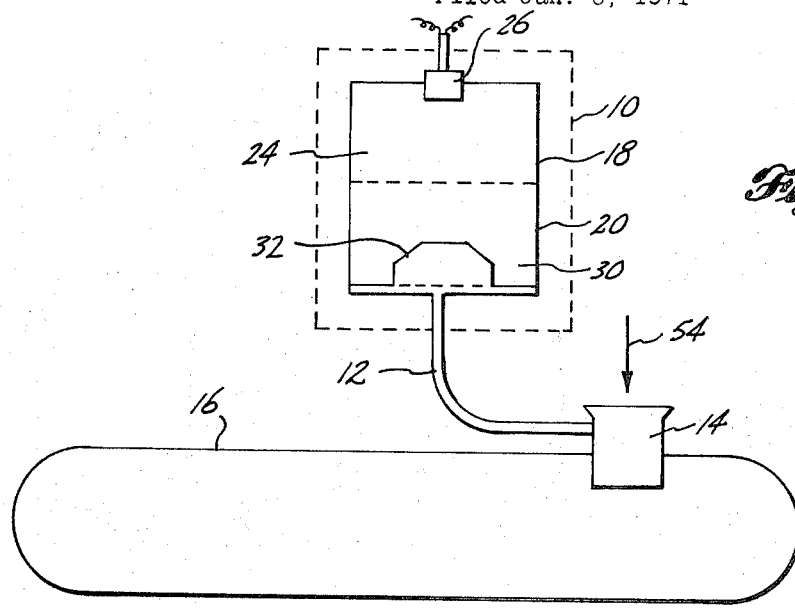
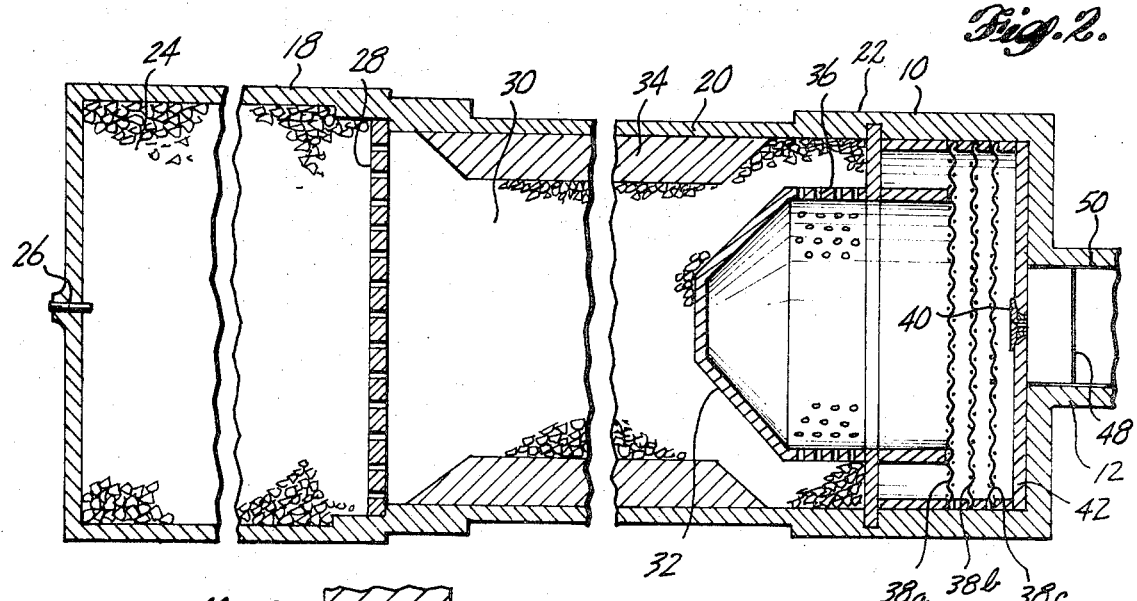
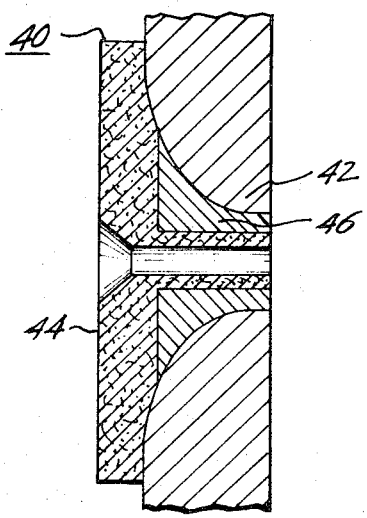

ABSTRACT OF THE DISCLOSURE

An emergency system which generates cool gases for pneumatic or pressurization systems, and for inflating inflatable objects. Hot gases are generated by a solid propellant. The hot gases flow through a dissociated bed of solid endothermic material which is decomposed to generate cool gases mixing with and cooling the hot gases. The flow of gases within the dissociated bed is directed by a baffle located at the outlet to the bed. The cooled gases flow via a variable area nozzle and into a gas receiver if used for pneumatic, pressurization or similar systems, or through an aspirator and into an inflatable device to be inflated.

BACKGROUND OF THE INVENTION

Description of the prior art

Emergency inflation of inflatable objects such as airplane escape slides, life rafts, etc., require a large volume of gases in a short period of time. One method of obtaining this large volume of gas is through the use of stored high pressure gases; however, the volume and weight of such gas storage means are unfeasible for certain applications, such as aircraft. A more feasible method would be a solid propellant system which generates gases having a high temperature that are cooled before being used. Cooling of the hot gases is accomplished by passing the hot gases through a solid material which decomposes and passes into gaseous state. The solid coolant material undergoes an endothermic reaction when it decomposes such that heat is absorbed by the solid material. The gases generated by the decomposition of the coolant material mix with and cool the hot gases from the propellant. However, difficulties are experienced in using solid coolant materials due to channeling of the hot gases when passing through the coolant. Once channeling takes place the effectiveness of the coolant is lost. Of course, various solutions of combating channeling have been devised, such as mixing discrete particles of the coolant with the propellant or impregnating charcoal with the coolant to form a coolant bed. Another solution is to use a solid block of coolant with axial perforations. Nevertheless, these solutions are not as effective and as reliable as the system disclosed hereinafter, which offers a light weight, small volume emergency solid-state cool gas generator. Furthermore, the invention differs from the known means in that flow of hot gases is diffused through a porous bed of endothermically-reacting particles, with physical characteristics selected to maintain bed porosity throughout the operating cycle.

SUMMARY OF THE INVENTION

This invention relates to a solid-state cool gas generation system. Solid-state may be defined as a cool gas generation system using solid propellant and solid coolant. A solid propellant is ignited to generate hot gases which pass through a dissociated bed of a solid endothermic material. The flow of hot gases through the solid coolant is controlled by the interstices in the dissociated bed which gives a multitude of paths for the gases and by a baffle located at the outlet to the dissociated bed. Heat from the flowing hot gases decomposes the solid coolant endothermically into gaseous decomposition products. This both cools and adds mass to the gas stream. The combined gases then flow to the gas receiver either directly or through an aspirator. The aspirator serves to entrain ambient air into the gas stream.

The solid propellant is activated by use of an igniter. The igniter may be either an electrically or mechanically actuated igniter which initiates burning of the propellant. The propellant burns to generate large quantities of gases under high pressure and high temperature. The propellant may be any of the known propellants such as double base nitroglycerin and nitrocellulose or a composite consisting of a hydrocarbon fuel binder and ammonium perchlorate and/or ammonium nitrate oxidizer. The propellant is burned in a propellant chamber in communication with a coolant chamber containing a dissociated bed of a solid endothermically decomposing material. The dissociated bed is preferably obtained by filling the coolant chamber with solid coolant pellets. The pellets may be spherical, square or cylindrical and are randomly placed in the coolant chamber. The pellets may be sized for optimum packing; that is, in a "bimodal" or "trimodal" size distribution. A baffle is located immediately before the outlet to the pellet bed. When the igniter is actuated, it induces burning in the solid propellant material. The propellant material generates large quantities of hot gases which are forced through the pellet bed, past the baffle and into the gas receiver, either directly or through an aspirator. The gas receiver may be a pneumatic accumulator, piston propellant tank or other mechanical device, or an inflatable object. The flowing hot gases are deflected by the baffle to flow first in an outwardly direction, then in an inwardly direction. The interstices between the pellets in combination with the baffle controls the flow of the hot gases through the solid endothermic pellet material.

A variable diameter orifice may be placed downstream from the outlet of the coolant bed to control the length of time of gas generation. This time may be varied from a fraction of a second to several seconds. It should be noted the term "downstream" refers to location with reference to the flow of gases. The orifice is partially or completely filled with a material that ablates or erodes due to temperature and/or pressure. The erodible material may be a composite of several materials having different erosion rates. The orifice may be partially closed with a material that will erode under certain conditions of temperature and/or pressure. The orifice then may be further closed by filling with a material which erodes at a less stringent condition as to temperature and/or pressure. The orifice may be further or completely closed with still another material which erodes under even lower conditions as to temperature and/or pressure. If completely closed, the material used for the closure will act as a seal and burst plug.

It is therefore an object of the invention to effect a lightweight cool gas generation system for inflating inflatable objects, for supplying working fluid for other pressurization systems, and/or pneumatic systems.

Another object is to control the flow of hot gases through a solid coolant bed in order to insure effective cooling of the gases before entering an inflatable object.

Still another object is to control the rate of gas generation in a solid-state cool gas generation system.

Other objects and advantages of this invention will be apparent from the following description, drawings and claims:

BRIEF DESCRIPTION OF THE DRAWING

FIG. 1 is a schematic drawing of a solid-state cool gas generation system for inflating inflatable objects.

FIG. 2 is a cross section of a solid-state gas generation chamber including a propellant and a coolant chamber.

FIG. 3 is a cross section of a composite erodible orifice.

DETAILED DESCRIPTION

Referring to FIGS. 1, 2, and 3 in detail, the system discloses in series; a solid-state gas generator container 10, which is connected, via a feed line 12 employing an aspirator 14, to an inflatable object 16. The solid-state gas generator container 10 comprises: a propellant chamber 18, a coolant chamber 20, and an aft cap 22. The propellant chamber 18 contains a solid propellant 24 which is burned inside the propellant chamber to generate a large volume of gases at high temperature and pressures. Various propellants 24 may be used; however, in this embodiment an ammonium nitrate-oxidized composite is used. An electrically or mechanically actuated igniter 26 is used to initiate burning in the solid propellant. Expanding gases pass through the screen or orifice plate 28 into the coolant chamber 20.

Coolant chamber 20 contains a dissociated bed of an endothermic material of solid pellets 30 which decomposes when heated with an endothermic reaction. The pellets are made from ammonium oxalate and formed at 10,000 p.s.i. Other materials may be used for the endothermic solid pellet materials. Materials such as ammonium bicarbonate, ammonium salicylate, ammonium carbamate, and ammonium hydrosulfide may be used. The pellets are randomly placed in the coolant chamber to give a plurality of interstices between the pellets. The interstices provide a multitude of paths for hot gases generated from the solid propellant 24 as they pass through the coolant pellets.

A baffle 32 is located inside the coolant chamber 20 and acts as the outlet from the pellet bed. The baffle deflects the flow of hot gases through the coolant; first, in an outwardly direction and then in an inwardly direction. It is preferable to control the dimensions of the coolant bed such that the ratio of the length to the cross-sectional area of the bed ranges from about 0.5 to 1.0. This ratio will vary with the choice of propellant and coolant. The ratio may be obtained by the selection of inside dimensions of the coolant chamber 20, or the ratio may be also obtained by the use of inserts. In the present invention the inserted interior sleeve 34 acts as a ratio control means in the coolant chamber. Cooled gases leaves the coolant chamber 20 through a multitude of orifices 36 arranged around the periphery of the baffle 32. Orifices 36 are sized such that coolant particles carried by the stream of moving gas are unable to pass through unless their surface area of volume ratios approach infinity. In this embodiment the orifices 36 are considerably larger. Filter screens 38A, 38B, and 38C are of different mesh such that 38A has the large size mesh, and 38C the smallest.

The time required for inflating the inflatable object 16 may be controlled by a variable nozzle 40. This nozzle 40 as shown in FIG. 3 is a composite having an orifice plate 42, a first ablative material 44, and a second erodible material 46. At the beginning of the operation, the first ablative material 46 ablates away as the temperature and pressure increases due to the expanding gases. The expanding gases continue to rise in temperature and pressure and consequently the ablative material 44 disappears. At this time a sustained mass volume of gases flow through the orifice defined by orifice plate 42. In the preferred embodiment, the ablative material 44 is of a wood-metal composite and the ablative material 46 is of sulfur. A Mylar film burst diaphragm 48 is installed in the aft cap 22 next to the nipple 50 which is used for connecting feed line 12. This feed line may be rigid or flexible. The cooled gases will flow through the feed line, vent through the aspirator 14, to entrain ambient air 54 into the flow and then enter and inflate the inflatable object 16, or the cooled gases may be used to flow into any receiver where pressurization is required.

Having thus described the above invention, obvious modifications may be contemplated and various materials having more or less similar reactions may be substituted herein which, however, are considered to be within the scope and within the spirit of the invention as claimed hereinafter.

We claim:

1. A solid state gas generator comprising
   (a) a container means, having a first chamber, a second chamber and an aft cap;
   (b) said first chamber carrying a solid propellant for generating a high temperature gas;
   (c) said second chamber carrying a bed of solid endothermic material in pellets form to be decomposed into a low temperature gas by said high temperature gas;
   (d) a screen means disposed in said container means between said first chamber and said second chamber;
   (e) said pellets of endothermic material having predetermined shapes for assuring a plurality of interstices between said pellets in said second chamber, so that said high temperature gas can react with said pellets and intermix with said generated low temperature gas for producing a mixed cooled gas, and
   (f) said aft cap means incorporating an interior baffle and exit orifices for guiding said mixed cooled gas via said exit orifices towards an associated gas receiver means and wherein said aft cap carries a variable nozzle of ablative material composed of a first ablative wood-metal layer and a second sulfur layer downstream of said exit orifices for controlling said output of said gas product initial pressure within a predetermined time range.

References Cited

UNITED STATES PATENTS

| | | | |
|---|---|---|---|
| 2,206,057 | 7/1940 | Skinner | 60—200 A UX |
| 3,305,319 | 2/1967 | Kowalick et al. | 23—281 |
| 3,532,359 | 10/1970 | Teague et al. | 23—281 X |
| 3,558,285 | 1/1971 | Ciccone et al. | 23—281 |
| 3,599,430 | 8/1971 | Kromrey | 60—200 A X |

JOSEPH SCOVRONEK, Primary Examiner

U.S. Cl. X.R.

60—200 A; 138—45, 46; 141—4; 239—265.15, 591; 252—372; 280—150 AB; 9—321